United States Patent
Park

(10) Patent No.: US 9,788,390 B2
(45) Date of Patent: Oct. 10, 2017

(54) AC DIRECT DRIVE LAMP HAVING LEAKAGE CURRENT PROTECTION CIRCUIT

(71) Applicant: LG INNOTEK CO., LTD., Seoul (KR)

(72) Inventor: Jong June Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/273,960

(22) Filed: Sep. 23, 2016

(65) Prior Publication Data

US 2017/0094748 A1 Mar. 30, 2017

(30) Foreign Application Priority Data

Sep. 25, 2015 (KR) .................. 10-2015-0136818

(51) Int. Cl.
| | |
|---|---|
| *H05B 37/00* | (2006.01) |
| *H05B 33/08* | (2006.01) |
| *H02M 1/44* | (2007.01) |
| *H02M 1/32* | (2007.01) |
| *H02M 7/06* | (2006.01) |

(52) U.S. Cl.
CPC .......... *H05B 33/0887* (2013.01); *H02M 1/32* (2013.01); *H02M 1/44* (2013.01); *H05B 33/0815* (2013.01); *H02M 7/06* (2013.01)

(58) Field of Classification Search
CPC ............ H05B 33/0875; H05B 33/0878; H05B 33/0881; H05B 33/0884; H05B 33/0887
USPC ..... 315/200 R, 206–207, 268, 272, 349, 352
See application file for complete search history.

(56) References Cited

U.S. PATENT DOCUMENTS

| | | | | |
|---|---|---|---|---|
| 8,686,667 | B2* | 4/2014 | Mishima | H02M 3/1588 315/210 |
| 2007/0040516 | A1* | 2/2007 | Chen | H05B 39/045 315/291 |
| 2007/0182347 | A1* | 8/2007 | Shteynberg | H05B 33/0815 315/312 |
| 2011/0163689 | A1* | 7/2011 | Kim | H05B 33/0887 315/294 |
| 2012/0187870 | A1* | 7/2012 | Iwai | H05B 33/0884 315/307 |
| 2012/0249012 | A1* | 10/2012 | Xu | H05B 33/0815 315/291 |
| 2012/0286689 | A1* | 11/2012 | Newman, Jr. | H05B 41/2828 315/246 |
| 2013/0100710 | A1* | 4/2013 | Kang | H02H 9/04 363/21.12 |

(Continued)

*Primary Examiner* — Jason M Crawford
(74) *Attorney, Agent, or Firm* — LRK Patent Law Firm

(57) ABSTRACT

An AC direct drive lamp including a leakage current protection circuit includes an input stage configured to receive external power, a rectification circuit configured to rectify the external power received from the input stage, a control module electrically connected to the output stage of the rectification circuit and configured to sense and control the state of at least one of the rectification circuit, a switch module, and a light source, the switch module connected between the input stage and the control module in a feedback form and configured to switch on/off depending on a predetermined condition, and the light source electrically connected to the control module and configured to radiate light when power is applied.

8 Claims, 5 Drawing Sheets

(56) References Cited

U.S. PATENT DOCUMENTS

| | | | | |
|---|---|---|---|---|
| 2013/0127357 A1* | 5/2013 | Wu | ............... | H05B 41/28 |
| | | | | 315/200 R |
| 2013/0313989 A1* | 11/2013 | Chen | ............ | H05B 33/0887 |
| | | | | 315/200 R |
| 2014/0021874 A1* | 1/2014 | Chen | ............ | H05B 33/0818 |
| | | | | 315/200 R |
| 2014/0300289 A1* | 10/2014 | Zhu | ............ | H05B 33/0815 |
| | | | | 315/206 |

\* cited by examiner

AC DIRECT DRIVE LAMP HAVING LEAKAGE CURRENT PROTECTION CIRCUIT

CROSS REFERENCE TO RELATED APPLICATION

The present application claims the benefit of Korean Patent Application No. 10-2015-0136818, filed in the Korean Intellectual Property Office on Sep. 25, 2015, the entire contents of which are incorporated herein by reference.

BACKGROUND OF THE INVENTION

1. Technical Field

The present invention relates to an AC direct drive lamp including a leakage current protection circuit, including an input stage configured to receive external power, a rectification circuit configured to rectify the external power received from the input stage, a control module electrically connected to the output stage of the rectification circuit and configured to sense and control the state of at least one of the rectification circuit, a switch module, and a light source, the switch module connected between the input stage and the control module in a feedback form and configured to switch on/off depending on a predetermined condition, and the light source electrically connected to the control module and configured to radiate light when power is applied.

2. Description of the Related Art

In a conventional LED lamp, as shown in FIG. 1A, an AC direct drive (or embedded type) lamp in which external power 120 is connected to one end 121 of an electrode of a lamp 130 has been implemented in an insulating drive type. In contrast, as shown in FIG. 1B, in a recent LED lamp, an AC direct drive (or embedded type) lamp in which external power 120 is connected to both ends 231 and 232 of the electrodes of a lamp 230 has been implemented in a non-insulating type.

Referring to FIG. 2, in the case of the AC direct drive lamp of a non-insulating type, a drive control module operates only when both ends 231 and 232 of a lamp 230 are normally connected before power 210 is applied. However, when one end 231 of the lamp 130 is connected to the power and the other end 232 of the lamp 130 comes into contact with a user 240 in the state in which the power 210 has been applied, there is a problem in that the user may be subject to a danger of a momentary electric shock because the leakage current flows into the ground GND.

Furthermore, a common mechanical type switch, such as a contact type push method, is used to prevent an electric shock attributable to the leakage current when a user replaces or repairs a lamp. However, when power is applied to the lamp, a driving voltage of about 1 kV is first applied for 0.2 second. If a product to which the mechanical type switch has been applied is used for a long time, power of a high voltage continues to be applied to a metal plate within the mechanical type switch. Accordingly, the mechanical type switch that needs to be an open state physically enters a short-circuit state temporarily. As a result, there is a problem in that a user is subject to a danger of a momentary electric shock.

Furthermore, the mechanical type switch has a problem in that a defect may occur because moisture may be penetrated between switches because waterproofing, that is, the most important issue of an LED lamp, cannot be applied to the mechanical type switch. Accordingly, research has been carried out on various methods for implementing an AC direct drive lamp, which block an instant overvoltage and prevent the leakage current.

SUMMARY OF THE INVENTION

Accordingly, an object of the present invention is to provide an AC direct drive lamp including a leakage current protection circuit, including an electronic switch in order to prevent a momentary electric shock as described above.

Technical objects to be achieved by the present invention are not limited to the object, and various technical objects may be included within a range evident to those skilled in the art from the following description.

An AC direct drive lamp including a leakage current protection circuit according to an embodiment of the present invention includes an input stage configured to receive external power, a rectification circuit configured to rectify the external power received from the input stage, a control module electrically connected to the output stage of the rectification circuit and configured to sense and control the state of at least one of the rectification circuit, a switch module, and a light source, the switch module connected between the input stage and the control module in a feedback form and configured to switch on/off depending on a predetermined condition, and the light source electrically connected to the control module and configured to radiate light when power is applied.

Furthermore, an AC direct drive lamp including a leakage current protection circuit according to an embodiment of the present invention further includes further includes the input stage, an EMI filter module connected to the input stage of the rectification circuit in parallel, a bypass diode connected between the output stage of the rectification circuit and the control module in series and configured to block a current in an opposite direction when the switch module is an off state, and an electrolytic capacitor connected to the output stage of the rectification circuit in parallel and configured to correct the distortion of input power.

Furthermore, in the AC direct drive lamp including a leakage current protection circuit according to an embodiment of the present invention, the rectification circuit includes a bridge diode.

Furthermore, in the AC direct drive lamp including a leakage current protection circuit according to an embodiment of the present invention, the switch module includes a rectification diode, a first resistor and a second resistor configured to perform a voltage division, and a switch element configured to switch on/off depending on a predetermined condition.

Furthermore, in the AC direct drive lamp including a leakage current protection circuit according to an embodiment of the present invention, the switch module includes a rectification diode, a TVS diode configured to operate in response to a predetermined voltage or more, a protection resistor configured to prevent damage to the TVS diode, and a switch element configured to switch on/off depending on a predetermined condition.

In this case, in the AC direct drive lamp including a leakage current protection circuit according to an embodiment of the present invention, the TVS diode operates when a voltage applied to the TVS diode is 54 V or higher.

Furthermore, in the AC direct drive lamp including a leakage current protection circuit according to an embodiment of the present invention, the switch module further includes an RC filter module performing noise filtering.

Furthermore, in the AC direct drive lamp including a leakage current protection circuit according to an embodiment of the present invention, the switch element switches on/off depending on the size of a voltage applied thereto, and the switch element includes a thyristor (SCR) or a field effect transistor (FET).

Furthermore, in the AC direct drive lamp including a leakage current protection circuit according to an embodiment of the present invention, the switch module is an on state when the external power is normally inputted to the input stage, and the switch module is an off state when the external power is not normally inputted to the input stage.

Furthermore, in the AC direct drive lamp including a leakage current protection circuit according to an embodiment of the present invention, the light source includes an LED, and the AC direct drive lamp includes a tube type lamp.

DETAILED DESCRIPTION

Hereinafter, an "AC direct drive lamp including a leakage current protection circuit" according to an embodiment of the present invention is described in detail with reference to the accompanying drawings. Embodiments to be described are provided in order for those skilled in the art to easily understand the technical spirit of the present invention, and the present invention is not restricted by the embodiments. Furthermore, contents represented in the accompanying drawings have been diagramed in order to easily describe the embodiments of the present invention, and the contents may be different from drawing forms that are actually implemented.

Elements to be described herein are only examples for implementing the embodiments of the present invention. Accordingly, in other implementations of the present invention, different elements may be used without departing from the spirit and scope of the present invention.

Furthermore, an expression that some elements are "included" is an expression of an "open type", and the expression simply denotes that the corresponding elements are present, but should not be construed as excluding additional elements.

Furthermore, expressions, such as "the first" and "the second", are expressions used to only distinguish a plurality of elements from one another, and do not limit the sequence of the elements or other characteristics.

Furthermore, "power" according to an embodiment of the present invention may include all types of electric energy which may be used in a common electrical circuit, such as a "voltage", "electric power", and an "electric current."

Figure 1A:
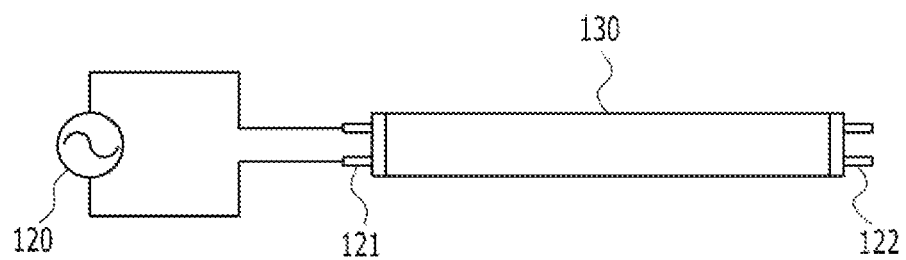
FIGS. 1A and 1B are exemplary diagrams showing a conventional AC direct drive lamp.
Figure 1B:
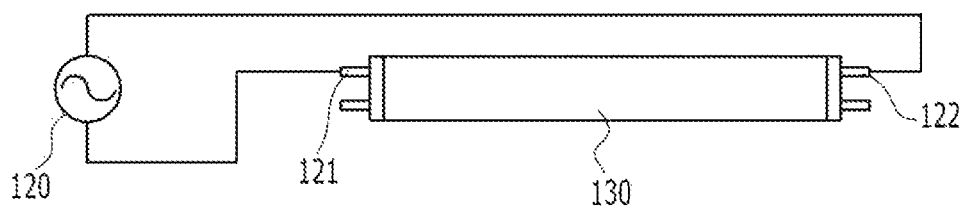
Figure 2:
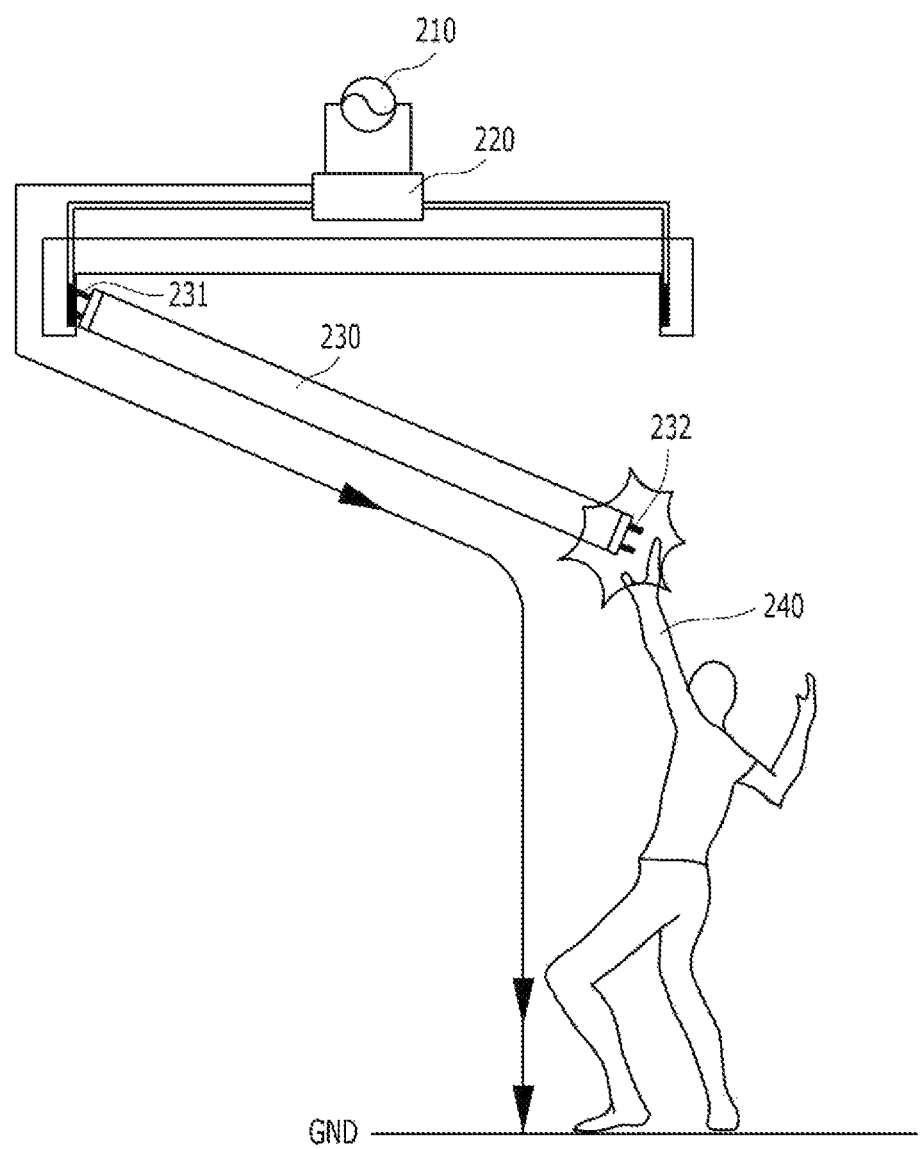
FIG. 2 is an exemplary diagram showing a conventional AC direct drive lamp.

FIGS. 1A and 1B are exemplary diagrams showing a conventional AC direct drive lamp, and FIG. 2 is an exemplary diagram showing a conventional AC direct drive lamp.

Referring to FIGS. 1A and 1B, in a conventional LED lamp, as shown in FIG. 1A, an AC direct drive (or embedded type) lamp in which external power 120 is connected to one end 121 of an electrode of a lamp 130 has been implemented in an insulating drive type. In contrast, as shown in FIG. 1B, in a recent LED lamp, an AC direct drive (or embedded type) lamp in which external power 120 is connected to both ends 231 and 232 of the electrodes of a lamp 230 has been implemented in a non-insulating type.

However, as shown in FIG. 2, when a user 240 replaces or repairs the tube type lamp 230, he or she may directly come into contact with the second electrode 232. At this time, a ballast stabilizer 220 connected to commercial power 210 may conduct electricity through the first electrode 231 of the tube type lamp. The leakage current may flow to the user on the ground GND, and an overvoltage may be applied to the tube type lamp.

Figure 3:
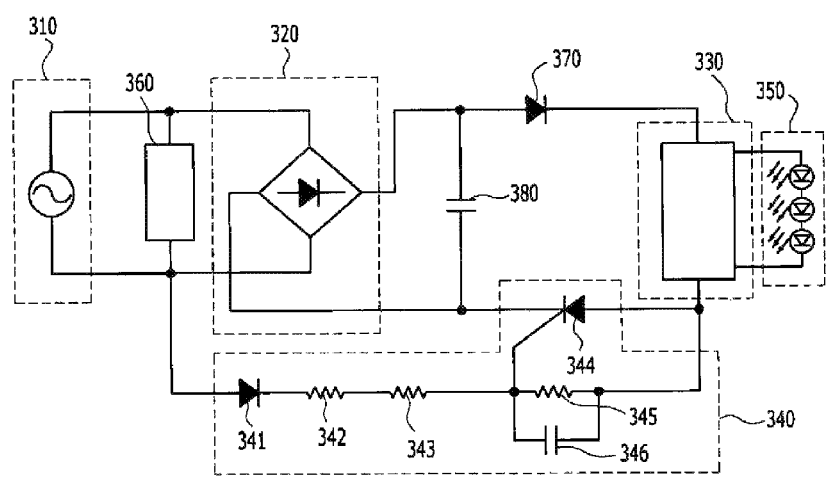
FIG. 3 is an exemplary diagram showing an AC direct drive lamp including a leakage current protection circuit according to an embodiment of the present invention.

FIG. 3 shows the configuration of an AC direct drive lamp including a leakage current protection circuit according to an embodiment of the present invention.

Referring to FIG. 3, the AC direct drive lamp including a leakage current protection circuit according to an embodiment of the present invention may include an input stage 310, a rectification circuit 320, a control module 330, a switch module 340, and a light source 350.

The input stage 310 receives external power. In the case of a ballast stabilizer-compatible lamp, commercial power may be converted into power of a specific amount in the ballast stabilizer and inputted to the input stage 310. However, the AC direct drive lamp according to an embodiment of the present invention does not include a ballast stabilizer because the lamp is directly connected to commercial power, such as 110 V, 220 V, or 380 V.

The rectification circuit 320 rectifies the external power received from the input stage 310. In this case, the rectification circuit is a bridge diode.

The control module 330 is electrically connected to the output stage of the rectification circuit, and senses and controls the state of at least one of the rectification circuit, the switch module, and the light source.

The light source 350 is electrically connected to the control module and radiates light when power is applied. In this case, the light source is an LED.

Furthermore, the AC direct drive lamp including a leakage current protection circuit according to an embodiment of the present invention may further include an EMI filter module 360, a bypass diode 370, and an electrolytic capacitor 380.

The EMI filter module 360 are connected to the input stage 310 and the input stage of the rectification circuit 320 in parallel. An EMI filter refers to an electromagnetic interference filter and functions to remove noise for electromagnetic interference or a signal generated from a digital device.

The bypass diode 370 is connected to the output stage of the rectification circuit 320 and the control module 330 in series. The bypass diode 370 blocks a current in the opposite direction when the switch module 340 is an off state. For example, if power applied to the input stage 310 is abnormal, the state of the switch module 340 becomes an off state.

The meaning that power applied to the input stage 310 is abnormal is described below. A node at one node of input power may be normally connected, and a node at the other end of the input power may be various, such as an open state. If any one side of the input power becomes a connection state, there is a possibility that a current in the opposite direction from the control module 330, that is, a drive circuit, may be subject to a reverse bias to the input stage 310. Accordingly, a safer lamp may be implemented by properly locating elements, such as the bypass diode or a reverse bias diode.

The electrolytic capacitor 380 is connected to the output stage of the rectification circuit 320 in parallel, and corrects the distortion of input power. The input power is applied with an AC state because it is commercial power. The waveform of the input power may be distorted while the input power passes through the rectification circuit 320. The electrolytic capacitor 380 prevents an input voltage from being excessively distorted and also functions to perform noise filtering.

Furthermore, the AC direct drive lamp including a leakage current protection circuit according to an embodiment of the present invention includes the switch module 340 in order to prevent the leakage current through the operation of an electronic switch. In this case, the switch module 340 becomes an on state when external power is normally inputted to the input stage 310, and the switch module 340 becomes an off state when external power is not normally inputted to the input stage 310.

Assuming that an upper node of the input stage 310 is a node A and a lower node thereof is a node B, when both the node A and the node B are normally connected, a switch element is turned on according to the voltage division law of the switch module 340 or by the operation of a TVS diode, and the ground is normally connected. Accordingly, the AC direct drive lamp according to an embodiment of the present invention normally operates.

However, if the node A is a connection state, but the node B is an off state, the switch element is turned off because a voltage is not applied to the switch module 340. Accordingly, the leakage current is prevented, and the light source 350 is turned off. Likewise, if the node A is an open state and the node B is a connection state, a voltage is not applied to the switch module 340. Accordingly, the operation of the switch element is turned off and thus the light source 350 is turned off.

Furthermore, the switch module 340 may include a rectification diode 341, a first resistor 342, a second resistor 343, a switch element 344, and RC filters 345 and 346.

The rectification diode 341 is connected to a node between the input stage 310 and the input stage of the rectification circuit 320. Power received from the input stage 310 is commercial power and has an AC form. The input power is converted into a half-wave form through the rectification diode 341.

The first resistor 342 and the second resistor 343 are connected to the rectification diode in series, and function to divide a voltage. In this case, the input power of the input stage 310 passing through the rectification diode 341 is subjected to a voltage division or a current division depending on equivalent resistance of the first resistor, the second resistor, and another output stage.

The switch element 344 switches on/off depending on a predetermined condition. In this case, the switch element switches on/off in response to the size of a voltage applied to the switch element 344. Furthermore, the switch element 344 is a thyristor (SCR) or an FET. The switch element 344 may be implemented using all of semiconductor devices which may be used as an electrical switch element.

The switch element 344 according to an embodiment of the present invention may be implemented using a thyristor (SCR). The thyristor (SRC) is a 4-layer semiconductor device and is also called a silicon-controlled rectifier. Such a thyristor is one type of a rectifier. In the thyristor, a gate current from the gate of the thyristor flows into the cathode of the thyristor and thus conducts between the anode and the cathode. When a constant current passes through the gate, the thyristor has a property that the anode and the cathode conduct (i.e., switch on). When a current between the anode and the cathode becomes a specific value or less, the anode and the cathode stop (i.e., switch off). Accordingly, the thyristor may operate as a contactless on/off switch.

In such a thyristor, control of a high voltage and high current is easy, a control gain is high, and an on state can be maintained although a gate signal becomes extinct. Furthermore, the thyristor has advantages in that it has high reliability because lifespan is semi-permanent, it is strong against a surge voltage and current, and it can be installed very easily on a device or unit due to a small size and light weight.

The switch element 344 according to an embodiment of the present invention may be implemented using a Field Effect Transistor (FET). The FET has very high input impedance and is driven in response to a voltage. A current flowing between the drain and source of the FET is greatly changed in response to a voltage applied to the gate. Accordingly, the FET may also be used as an on/off switch because the on/off state of the FET may be greatly changed in response to a voltage applied to the gate.

The RC filters 345 and 346 perform noise filtering. The waveform of input power passing through the rectification diode 341, the first resistor 342, and the second resistor 343 may include noise. The RC filters are used to remove such noise. The values of resistance and capacitance may be properly controlled for the degree to which noise is removed and the waveform.

The AC direct drive lamp including a leakage current protection circuit according to an embodiment of the present invention is a tube type lamp. The input stage includes input electrodes at its both ends.

Figure 4:
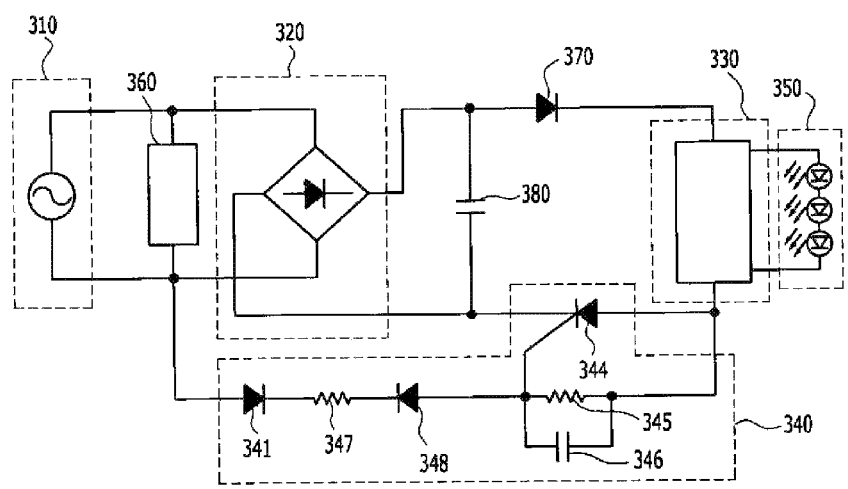
Figure 5:
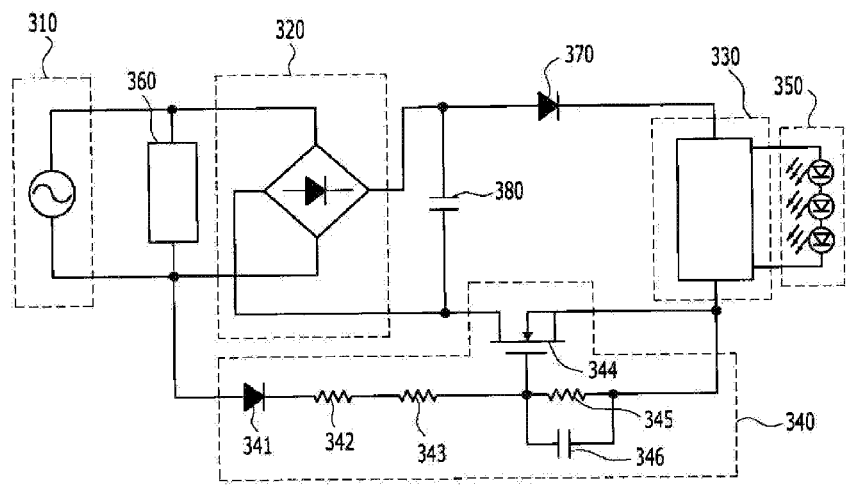
FIG. 5 is an exemplary diagram showing an AC direct drive lamp including a leakage current protection circuit according to another embodiment of the present invention.

FIG. 4 is an exemplary diagram showing an AC direct drive lamp including a leakage current protection circuit according to another embodiment of the present invention.

Referring to FIG. 4, in the AC direct drive lamp according to an embodiment of the present invention, a switch module 340 may include a protection resistor 347 and a TVS diode 348. The AC direct drive lamp of FIG. 4 has a basic structure identical with that of the AC direct drive lamp of FIG. 3, but includes the protection resistor 347 and the TVS diode 348 instead of the first resistor and the second resistor of FIG. 3. In this case, if an AC direct drive lamp is configured using the protection resistor and the TVS diode as in FIG. 4, it directly operates in response to a specific voltage or more even without a separate voltage division. Accordingly, there are advantages in that the TVS diode can be effectively protected and noise of a signal can be removed.

The TVS diode 348 operates in response to a predetermined voltage or more. In this case, the TVS diode may operate when a voltage applied thereto is 54 V or higher. Such a TVS diode is an electronic part designed to protect an electronic device which is sensitive in a high voltage transient, and may respond to an overvoltage more rapidly. Furthermore, the TVS diode has a greater cross section than a normal diode and operates by limiting a voltage in a specific level. In general, the TVS diode is associated with electrostatic discharge or a data line, and may be used to prevent a light strike and severe pressure induced by inductive load switching.

Furthermore, the TVS diode is used to protect a circuit from an electrical excessive state generated in electrostatic discharge or inductive load switching or inductive discharge.

In TVS, the size of a voltage which damages a circuit is reduced when the voltage is introduced to the extent that the circuit is not damaged. Furthermore, when an excessive phenomenon is generated, TVS immediately clamps a voltage based on a clamping voltage.

The protection resistor 347 is connected to the TVS diode 348 in series, and prevents damage to the TVS diode. When power is inputted to the first input stage or the second input stage, a momentary spike current may flow. The protection resistor can protect the TVS diode.

An embodiment of the present invention provides the AC direct drive lamp including an electronic switch in order to prevent a momentary electric shock. Accordingly, a consumer can be protected from an accident, such as a fall and a lighting failure.

Furthermore, if a conventional mechanical type switch is used, a mold and assembly failure may occur, and thus a separate cost for replacing a mold may be wasted. However, the AC direct drive lamp including a leakage current protection circuit according to an embodiment of the present invention does not have a problem, such as a separate mold failure because the electronic switch is used.

Furthermore, the AC direct drive lamp including a leakage current protection circuit according to an embodiment of the present invention can be disposed in an area including great humidity (e.g., outdoors) because it is capable of waterproofing processing. Accordingly, the degree of freedom of the installation of a service company can be improved.

Furthermore, in the AC direct drive lamp including a leakage current protection circuit according to an embodiment of the present invention, the switch modules are installed on both sides of a tube type lamp. Accordingly, a danger of an electric shock can be effectively prevented because the switch module enters an off state although any stage is touched.

The aforementioned embodiments of the present invention have been disclosed for illustrative purposes, and the present invention is not restricted by the embodiments. Furthermore, those skilled in the art to which the present invention pertains may modify and change the present invention in various ways within the spirit and scope of the present invention, and such modifications and changes should be construed as belonging to the scope of the present invention.

What is claimed is:

1. An AC direct drive lamp comprising a leakage current protection circuit, the lamp comprising:
   an input stage configured to receive external power;
   an EMI (electromagnetic interference) filter module connected in parallel to the input stage and an input stage of the rectification circuit;
   a rectification circuit configured to rectify the external power received from the input stage;
   an electrolytic capacitor connected in parallel to an output stage of the rectification circuit and configured to correct distortion of input power;
   a control module electrically connected to the output stage of the rectification circuit and configured to sense and control a state of at least one of the rectification circuit, a switch module, and a light source;
   the switch module connected between the input stage and the control module in a feedback form and configured to switch on/off depending on a predetermined condition; and
   the light source electrically connected to the control module and configured to radiate light when power is applied,
   wherein the switch module comprises:
   a rectification diode;
   a first resistor and a second resistor configured to perform voltage division; and
   a switch element configured to switch on/off depending on a predetermined condition, and
   wherein the first resistor and the second resistor are connected between the input stage and the switch element.

2. The AC direct drive lamp of claim 1, further comprising a bypass diode connected in series between the output stage of the rectification circuit and the control module and configured to block a current in an opposite direction when the switch module is an off state.

3. The AC direct drive lamp of claim 1, wherein the rectification circuit comprises a bridge diode.

4. The AC direct drive lamp of claim 1, wherein the switch module comprises an RC filter module configured to perform noise filtering.

5. The AC direct drive lamp of claim 1, wherein the switch element switches on/off in response to a voltage applied to the switch element.

6. The AC direct drive lamp of claim 1, wherein the switch element comprises a thyristor (SCR) or a Field Effect Transistor (FET).

7. The AC direct drive lamp of claim 1, wherein:
   the switch module is in an on state when the external power is normally inputted to the input stage, and
   the switch module is in an off state when the external power is not normally inputted to the input stage.

8. The AC direct drive lamp of claim 1, wherein the light source comprises a light emitting diode (LED).

* * * * *